US012217366B2

(12) United States Patent
Hamada et al.

(10) Patent No.: US 12,217,366 B2
(45) Date of Patent: Feb. 4, 2025

(54) MEDIA DISTRIBUTION DEVICE AND MEDIA DISTRIBUTION METHOD

(71) Applicant: SONY GROUP CORPORATION, Tokyo (JP)

(72) Inventors: Toshiya Hamada, Tokyo (JP); Takumi Tsuru, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 148 days.

(21) Appl. No.: 17/998,500

(22) PCT Filed: May 11, 2021

(86) PCT No.: PCT/JP2021/017801
§ 371 (c)(1),
(2) Date: Nov. 11, 2022

(87) PCT Pub. No.: WO2021/241190
PCT Pub. Date: Dec. 2, 2021

(65) Prior Publication Data
US 2023/0215102 A1 Jul. 6, 2023

(30) Foreign Application Priority Data

May 25, 2020 (JP) ................................. 2020-090539

(51) Int. Cl.
*G06T 19/00* (2011.01)
*G06T 7/20* (2017.01)
(Continued)

(52) U.S. Cl.
CPC ............. *G06T 19/003* (2013.01); *G06T 7/20* (2013.01); *G10L 13/04* (2013.01); *G10L 19/167* (2013.01); *G06T 2210/61* (2013.01)

(58) Field of Classification Search
None
See application file for complete search history.

(56) References Cited

U.S. PATENT DOCUMENTS 11,775,051 B2 * 10/2023 Laaksonen ................ H04S 7/30
345/419
2016/0330522 A1 11/2016 Newell et al.
(Continued)

FOREIGN PATENT DOCUMENTS

| WO | 2018/096954 A1 | 5/2018 |
| WO | 2019/002665 A1 | 1/2019 |
| WO | 2019/141899 A1 | 7/2019 |

OTHER PUBLICATIONS

"Information technology—Coding of audio-visual objects—Part 11: Scene description and application engine", International Organization for Standardization, ISO/IEC 14496-11, 2nd Edition, Nov. 1, 2015, 12 pages.

(Continued)

*Primary Examiner* — David H Chu
(74) *Attorney, Agent, or Firm* — CHIP LAW GROUP

(57) ABSTRACT

The present disclosure relates to a media distribution device, a media distribution method, and a program enabling to generate a guide voice more appropriately. A media distribution device includes a guide voice generation unit that generates a guide voice describing a rendered image viewed from a viewpoint in a virtual space by using a scene description as information describing a scene in the virtual space and a user viewpoint information indicating a position and a direction of the viewpoint of a user; and an audio encoding unit that mixes the guide voice with original audio, and encodes the guide voice. The present technology can be applied to, for example, a media distribution system that distributes 6DoF media.

5 Claims, 9 Drawing Sheets

(51) Int. Cl.
    *G10L 13/04*    (2013.01)
    *G10L 19/16*    (2013.01)

(56) References Cited

U.S. PATENT DOCUMENTS

| | | | |
|---|---|---|---|
| 2017/0318407 A1 | 11/2017 | Meister et al. | |
| 2018/0165864 A1* | 6/2018 | Jin | G06F 3/0346 |
| 2019/0114830 A1 | 4/2019 | Bouazizi et al. | |
| 2020/0209952 A1* | 7/2020 | Järvinen | G06F 3/017 |
| 2020/0210138 A1* | 7/2020 | Macconnell | G06F 3/04815 |
| 2021/0258690 A1* | 8/2021 | De Bruijn | G06F 3/165 |
| 2023/0007427 A1* | 1/2023 | Mate | G06F 3/165 |
| 2023/0401798 A1* | 12/2023 | Bigham | G06T 19/006 |

OTHER PUBLICATIONS

International Search Report and Written Opinion of PCT Application No. PCT/JP2021/017801, issued on Jul. 27, 2021, 08 pages of ISRWO.

\* cited by examiner

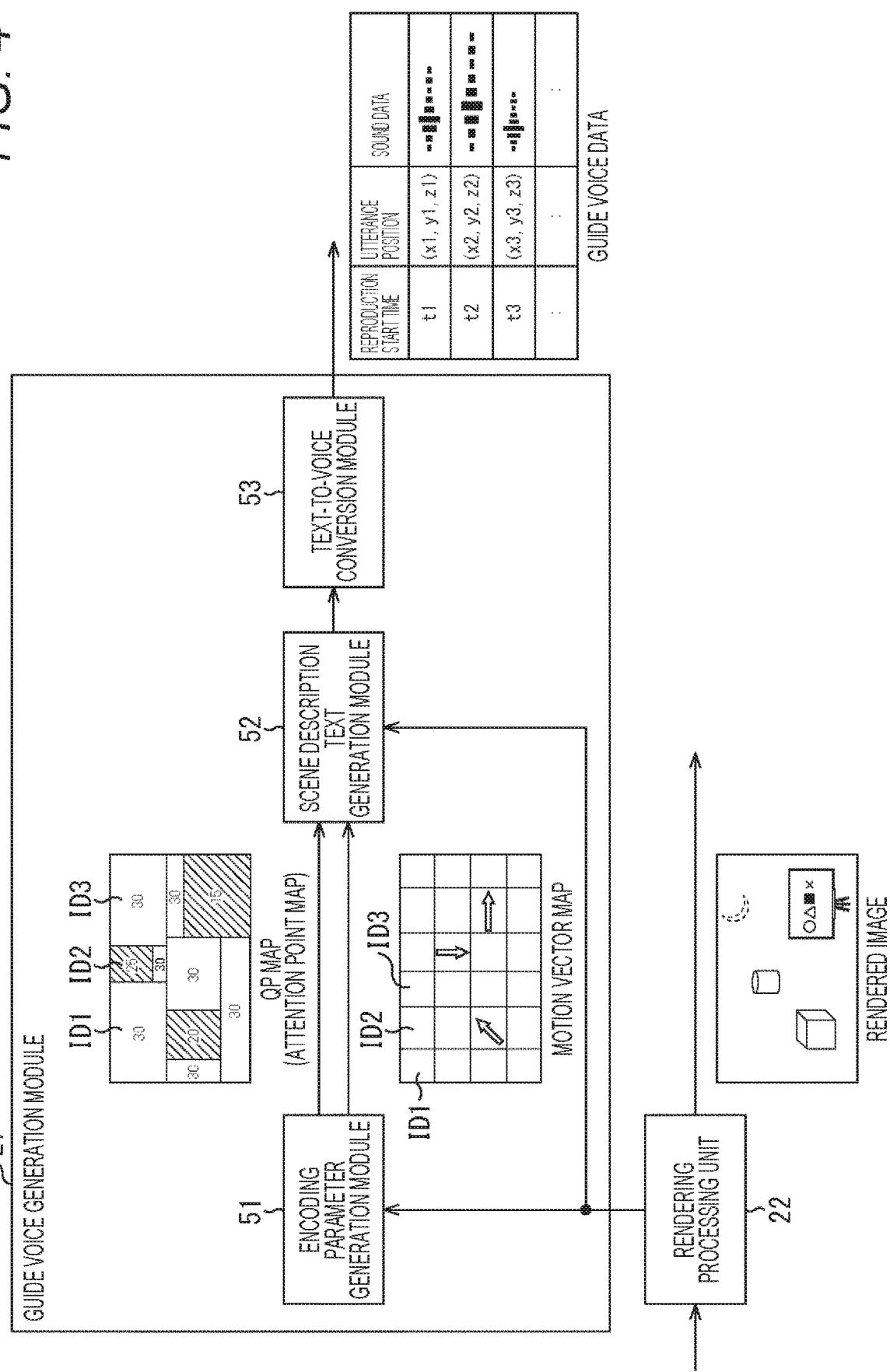

FIG. 5

RESOLUTION DISTRIBUTION INFORMATION IN IMAGE (INFORMATION REPRESENTING ACTUAL RESOLUTION FOR EACH REGION)

| REGION ID | REGION (CLOSED REGION SURROUNDED BY STRAIGHT LINE CONNECTING POINT AND POINT) | RESOLUTION VALUE (HORIZONTAL RESOLUTION, VERTICAL RESOLUTION) [NUMBER OF PIXELS PER UNIT] |
|---|---|---|
| 1 | (xr11, yr11), (xr12, yr12), … | (rh1, rv1) |
| 2 | (xr21, yr21), (xr22, yr22), … | (rh2, rv2) |
| 3 | (xr31, yr31), (xr32, yr32), … | (rh3, rv3) |
| ⋮ | ⋮ | ⋮ |

OBJECT REGION INFORMATION OCCUPIED BY EACH OBJECT IN IMAGE (INFORMATION REPRESENTING POSITION AND MOTION OF EACH OBJECT WHEN VIEWED FROM VIRTUAL CAMERA)

| REGION ID | REGION (CLOSED SPACE SURROUNDED BY STRAIGHT LINE CONNECTING POINT AND POINT) | CENTER POSITION OF OBJECT (ORIGIN OF LOCAL COORDINATES OF OBJECT) | MOTION VECTOR OF CENTER POSITION OF OBJECT |
|---|---|---|---|
| 1 | (xp11, yp11), (xp12, yp12), … | (xc1, yc1) | (xm1, ym1) |
| 2 | (xp21, yp21), (xp22, yp22), … | (xc2, yc2) | (xm2, ym2) |
| 3 | (xp31, yp31), (xp32, yp32), … | (xc3, yc3) | (xm3, ym3) |
| ⋮ | ⋮ | ⋮ | ⋮ |

IMAGE CHANGE INFORMATION REPRESENTING CHANGE IN IMAGE

| VALUE | MEANING OF VALUE |
|---|---|
| 0 | NO CHANGE FROM PREVIOUS FRAME |
| 1 | THERE IS A CHANGE FROM PREVIOUS FRAME |

FIG. 6

QP MAP

| REGION ID | COORDINATES OF TWO POINTS REPRESENTING RECTANGLE | QP VALUE |
|---|---|---|
| 1 | (xq11, yq11) – (xq12, yq12) | 30 |
| 2 | (xq21, yq21) – (xq22, yq22) | 25 |
| 3 | (xq31, yq31) – (xq32, yq32) | 30 |
| .. | .. | .. |

MOTION VECTOR MAP

| REGION ID | COORDINATES OF TWO POINTS REPRESENTING RECTANGLE | MOTION VECTOR |
|---|---|---|
| 1 | (xv11, yv11) – (xv12, yv12) | (xo1, yo1) |
| 2 | (xv21, yv21) – (xv22, yv22) | (xo2, yo2) |
| 3 | (xv31, yv31) – (xv32, yv32) | (xo3, yo3) |
| .. | .. | .. |

FIG. 7

GUIDE VOICE DATA

| REPRODUCTION START TIME | COORDINATES OF UTTERANCE POSITION | SOUND DATA |
|---|---|---|
| t1 | (x1, y1, z1) | data1.wav |
| t2 | (x2, y2, z2) | data2.wav |
| t3 | (x3, y3, z3) | data3.wav |
| .. | .. | .. |

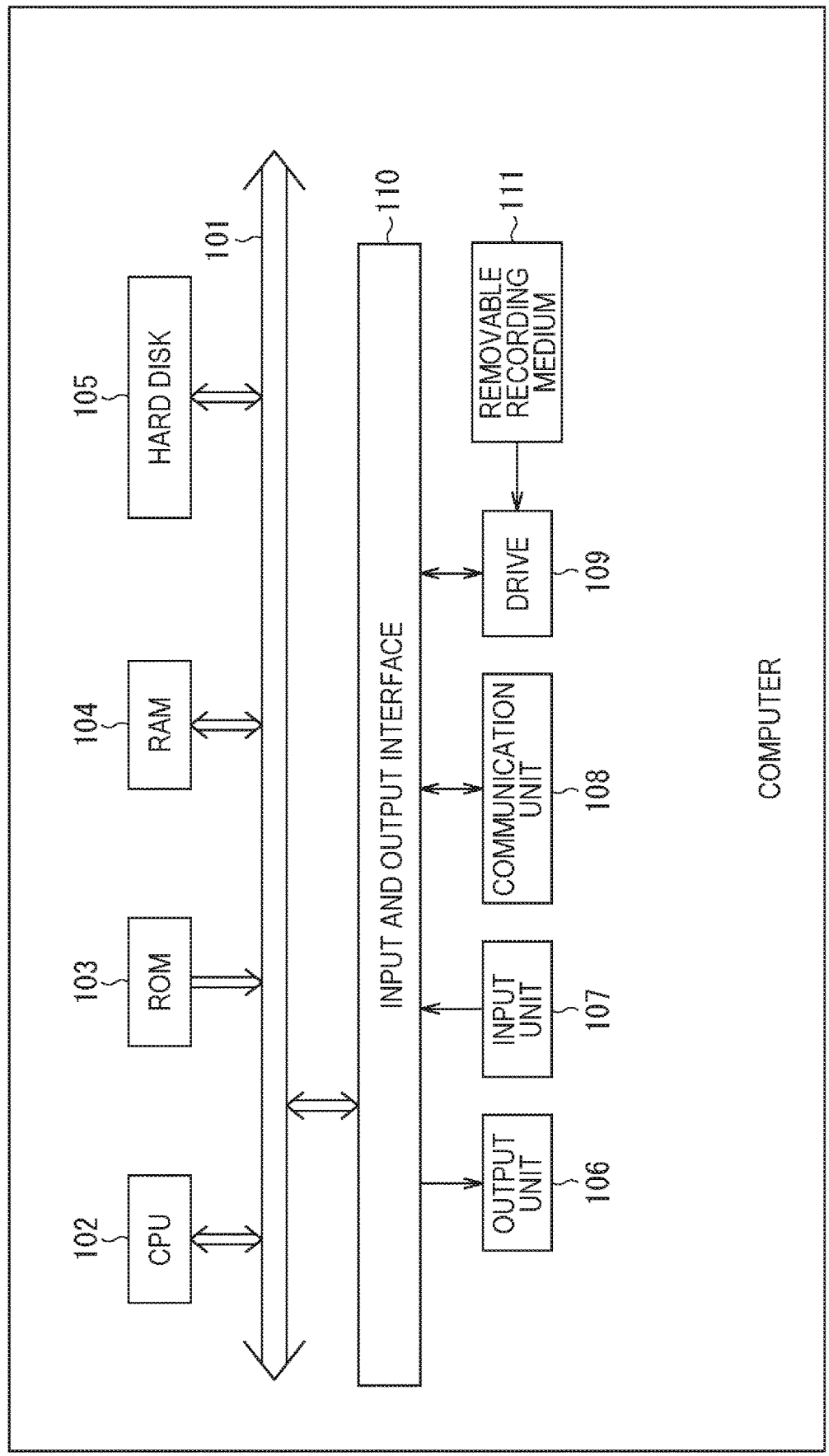

MEDIA DISTRIBUTION DEVICE AND MEDIA DISTRIBUTION METHOD

CROSS REFERENCE TO RELATED APPLICATIONS

This application is a U.S. National Phase of International Patent Application No. PCT/JP2021/017801 filed on May 11, 2021, which claims priority benefit of Japanese Patent Application No. JP 2020-090539 filed in the Japan Patent Office on May 25, 2020. Each of the above-referenced applications is hereby incorporated herein by reference in its entirety.

TECHNICAL FIELD

The present disclosure relates to a media distribution device, a media distribution method, and a program, and more particularly, to a media distribution device, a media distribution method, and a program capable of more appropriately generating a guide voice.

BACKGROUND ART

In the related art, distribution of a three-dimensional content (also referred to as 3D content) expressing a three-dimensional object (also referred to as 3D object) in a three-dimensional space (also referred to as 3D space) has been proposed. Furthermore, as the 3D content, for example, a 6DoF content has been proposed in which a three-dimensional object in a three-dimensional space is expressed and a line-of-sight direction and a viewpoint position can be freely set at the time of reproduction.

As a distribution method of the 6DoF content, for example, a method of configuring a 3D space with a plurality of 3D objects and transmitting the 3D space as a plurality of object streams has been proposed. Then, at that time, for example, it has been proposed to use a description method called Scene Description. As the Scene Description, a method (MPEG-4 Scene Description) has been proposed in which a scene is expressed by a graph having a tree hierarchical structure called a scene graph, and the scene graph is expressed in a binary format or a text format (refer to, for example, Non-Patent Document 1).

Meanwhile, information for describing contents of a two-dimensional video such as television broadcasting and movie contents includes program information, subtitles, and the like in addition to a voice. For example, a method of reading contents of program information and subtitles created as text data with a synthesized voice has already been put into practical use.

On the other hand, in television broadcasting or package media, a plurality of voice streams can be combined with one video stream. Using this mechanism, a broadcaster or a content producer may prepare a voice for explaining contents of a video. The user can listen to a voice commentary by switching from a primary voice to a secondary voice. However, since it takes cost to create the voice commentary, the voice commentary is added only to some contents.

Furthermore, it is considered that there is a need for a guide voice for explaining the content of a scene also in future 6DoF media distribution. However, unlike the two-dimensional video in the related art, in the 6DoF media, the content of the video (scene) actually viewed by the user is changed according to the position of the user and the viewpoint direction of the user, and thus it is difficult to prepare a voice guide in advance. Even in a case where a dedicated guide voice is created for each of a large number of positions and directions, it takes enormous cost and is not realistic.

Here, a technology of recognizing characters in a video captured by a camera sensing device and the like has been put into practical use as an optical character recognition (OCR) device since a long time ago. Moreover, there is also a device in which the content of the recognized characters is used as an input of voice synthesis. In recent years, as an application for a smartphone, there are an application of recognizing characters in a video imaged by a camera built in the smartphone, and an application of reading text data with a synthesized voice. However, although the recognition rate is high in the case of character recognition of the paper surface by specific layout and font, in order to recognize characters represented by free position, size, and font in a video, an effort to increase the recognition rate has been made by technologies such as AI and deep learning, but the recognition rate is technically advanced and difficult, and erroneous recognition cannot be eliminated.

For example, in 6DoF media in which a viewer can move in a virtual space with six degrees of freedom, information associated with information regarding objects constituting a scene, and positional information indicating where to place the objects in the virtual space are required. These pieces of information are referred to as scene descriptions. With this information, it is possible to know where and what kind of object (building or person) is arranged in the virtual space, and in which direction any moving object will move. By combining such information with the information of the viewpoint position and direction of the user acquired by a sensor, the positional relationship (relative position) between each object and the user can be determined.

CITATION LIST

Non-Patent Document

Non-Patent Document 1: "ISO/IEC 14496-11", Second Edition, 2015-05-29

SUMMARY OF THE INVENTION

Problems to be Solved by the Invention

In the 6DoF content, the viewpoint of the user can be changed in six degrees of freedom (position x, y, z; direction p, q, r), and the user can view the inside of the three-dimensional space at a free position and in a free direction. For example, an application is assumed in which a user can freely move in a museum constructed in a virtual 3D space and which automatically provides the voice commentary on exhibits in the user's field of view. In such an application, since there is a degree of freedom of viewing, it is difficult to prepare in advance an appropriate comment text according to the scene viewed by the user. For example, it is possible to prepare a text that explains the exhibit for each exhibit as a part of the scene description which is the content configuration information.

However, in a case where a certain object is seen in which direction and in what size in the user's field of view, it is not realistic to prepare in advance a description text according to any pattern, such as using this description text, because the combination becomes enormous. This is also required to be solved in a use case such as virtual travel in a three-dimensional space.

Moreover, even in a case where an object that enters the user's field of view can be specified and a text describing the content of the video can be automatically generated from the viewpoint information of the user and the scene description that is the content configuration information, the guide voice needs to be reproduced in real time, and thus, not all of the guide voice can be necessarily reproduced. That is, it is necessary to select the description content. Therefore, for example, a method is conceivable in which the "importance level" is set in units of objects, and the guide voice is generated in the order of objects having a higher importance level. However, even in a case of the object having a high importance level, in a case where the object is seen at the edge of the user's field of view or in a case where the object is seen only very small because the object is away from the user (the screen occupancy is low), it cannot be said that the object is necessarily an important object in describing the scene.

As described above, even in a case where a text describing the content of the video viewed by the user can be generated from the viewpoint information of the user and the scene description which is the content configuration information, it is necessary to select the description content in order to apply the text to the guide voice requiring the real-time property. Accordingly, it is required to generate the guide voice by appropriately setting a criterion for selection.

The present disclosure has been made in view of such a situation, and an object thereof is to more appropriately generate the guide voice.

Solutions to Problems

A media distribution device according to an aspect of the present disclosure includes a guide voice generation unit that generates a guide voice describing a rendered image viewed from a viewpoint in a virtual space by using a scene description as information describing a scene in the virtual space and a user viewpoint information indicating a position and a direction of the viewpoint of a user; and an audio encoding unit that mixes the guide voice with original audio, and encodes the guide voice.

A media distribution method or a program according to another aspect of the present disclosure includes generating a guide voice describing a rendered image viewed from a viewpoint in a virtual space by using a scene description as information describing a scene in the virtual space and a user viewpoint information indicating a position and a direction of the viewpoint of a user, and mixing the guide voice with original audio, and encoding the guide voice.

In the aspect of the present disclosure, the guide voice describing the rendered image viewed from the viewpoint in the virtual space is generated by using the scene description as the information describing the scene in the virtual space and the user viewpoint information indicating the position and direction of the viewpoint of the user, and the guide voice is mixed with original audio, and is encoded.

BRIEF DESCRIPTION OF DRAWINGS

FIG. 4 is a block diagram illustrating a configuration example of a guide voice generation module.

FIG. 5 is a diagram illustrating an example of resolution distribution information, object region information, and image change information.

FIG. 6 is a diagram illustrating an example of a QP map and a motion vector map.

FIG. 7 is a diagram illustrating an example of guide voice data.

FIG. 9 is a block diagram illustrating a configuration example of an embodiment of a computer to which the present technology is applied.

MODE FOR CARRYING OUT THE INVENTION

Hereinafter, specific embodiments to which the present technology is applied will be described in detail with reference to the drawings.

Configuration Example of Media Distribution System

Figure 1:
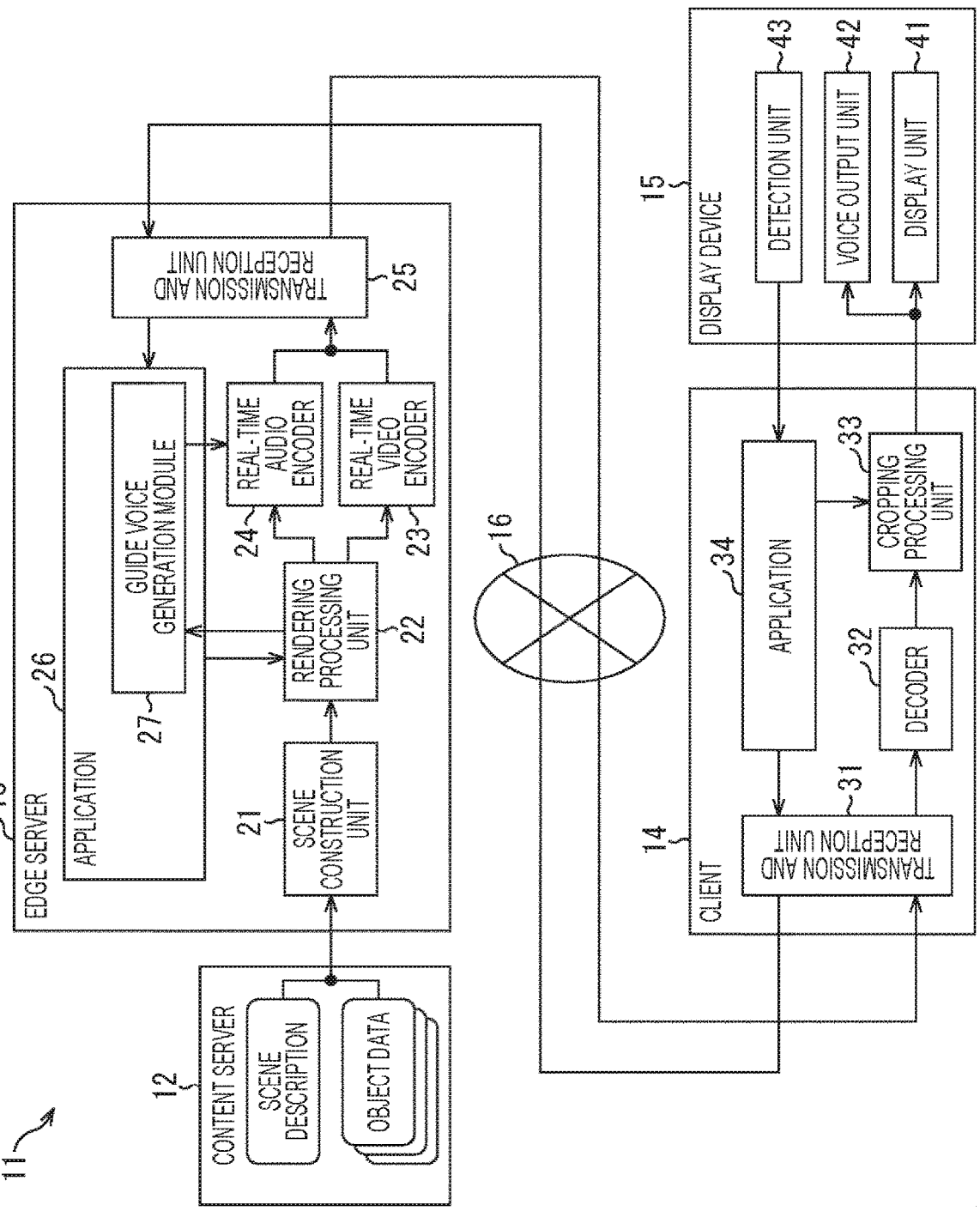
FIG. 1 is a block diagram illustrating a configuration example of an embodiment of a media distribution system to which the present technology is applied.

FIG. 1 is a block diagram illustrating a configuration example of an embodiment of a media distribution system to which the present technology is applied.

A media distribution system 11 illustrated in FIG. 1 distributes server-rendering 6DoF media, and provides a virtual space in which a user can move in six degrees of freedom. As illustrated, the media distribution system 11 includes a content server 12, an edge server 13, and a client 14. Then, a display device 15 is connected to the client 14, and the content server 12 and the edge server 13 are connected to the client 14 via a network 16.

The content server 12 stores scene descriptions and object data constituting contents serving as 6DoF media.

The edge server 13 acquires user viewpoint information indicating the position and direction of the viewpoint of the user from the client 14, generates a video to be presented to the user in rendering, and performs video encoding in real time for transmission to the client 14. The edge server 13 includes a scene construction unit 21, a rendering processing unit 22, a real-time video encoder 23, a real-time audio encoder 24, a transmission and reception unit 25, and an application 26, and the application 26 is provided with a guide voice generation module 27.

The client 14 receives the video from the edge server 13, and displays the video on the display device 15. The client 14 includes a transmission and reception unit 31, a decoder 32, a cropping processing unit 33, and an application 34.

The display device 15 includes a display unit 41, a voice output unit 42, and a detection unit 43.

The scene construction unit 21 reads the scene description and the object data from the content server 12, and constructs a virtual three-dimensional space by arranging the object data according to the scene description, for example.

The rendering processing unit 22 generates a rendered image by performing rendering processing such that the virtual three-dimensional space constructed by the scene construction unit 21 has an appearance from a viewport according to the user viewpoint information supplied via the application 26.

The real-time video encoder 23 encodes the rendered image generated in the rendering processing unit 22 in real time, and outputs the encoded image to the transmission and reception unit 25.

The real-time audio encoder 24 encodes an output audio, which is output when the rendering processing unit 22 generates the rendered image, in real time, and outputs the encoded output audio to the transmission and reception unit 25. Moreover, as described later, the real-time audio encoder 24 has a function of mixing the guide voice supplied from the guide voice generation module 27 with the output audio (original audio) from the rendering processing unit 22.

The transmission and reception unit 25 transmits the rendered image output from the real-time video encoder 23, and the output audio output from the real-time audio encoder 24 to the client 14 via the network 16. Furthermore, the transmission and reception unit 25 supplies the user viewpoint information transmitted from the client 14 via the network 16, to the application 26.

The application 26 executes processing on the edge server 13 side required for distributing 6DoF media by the media distribution system 11.

The guide voice generation module 27 generates an appropriate guide voice for the rendered image by using the rendered image supplied from the rendering processing unit 22 and information as described later with reference to FIG. 5, and supplies the generated guide voice to the real-time audio encoder 24.

The transmission and reception unit 31 supplies the rendered image and the output audio transmitted from the edge server 13 via the network 16, to the decoder 32. Furthermore, the transmission and reception unit 31 transmits the user viewpoint information supplied from the application 34, to the edge server 13 via the network 16.

The decoder 32 decodes the rendered image and the output audio supplied via the transmission and reception unit 31.

The cropping processing unit 33 crops and outputs the rendered image supplied from the decoder 32, in a visual field of the user according to the user viewpoint information supplied from the application 34.

The application 34 executes processing on the client 14 side required for distributing 6DoF media by the media distribution system 11.

The display unit 41 displays the rendered image cropped by the cropping processing unit 33.

In a case where the output audio (audio obtained by mixing the guide voice in the real-time audio encoder 24) output from the decoder 32 is supplied via the cropping processing unit 33, the voice output unit 42 reproduces the output audio to output a voice.

The detection unit 43 includes, for example, a gyro sensor or the like, detects the position and direction of the viewpoint of the user, and supplies the user viewpoint information to the application 34.

In the media distribution system 11 configured as described above, as illustrated in FIG. 2, a virtual three-dimensional space in which objects based on the object data are arranged according to the scene description is constructed by the scene construction unit 21. Then, the rendering processing unit 22 acquires the rendered image by performing rendering processing in the viewport according to the user viewpoint information indicating the position and direction of the viewpoint of the user. Here, an object represented by a broken line in the rendered image indicates that rendering is not performed because the distance is longer as the object becomes the background.

Figure 3:
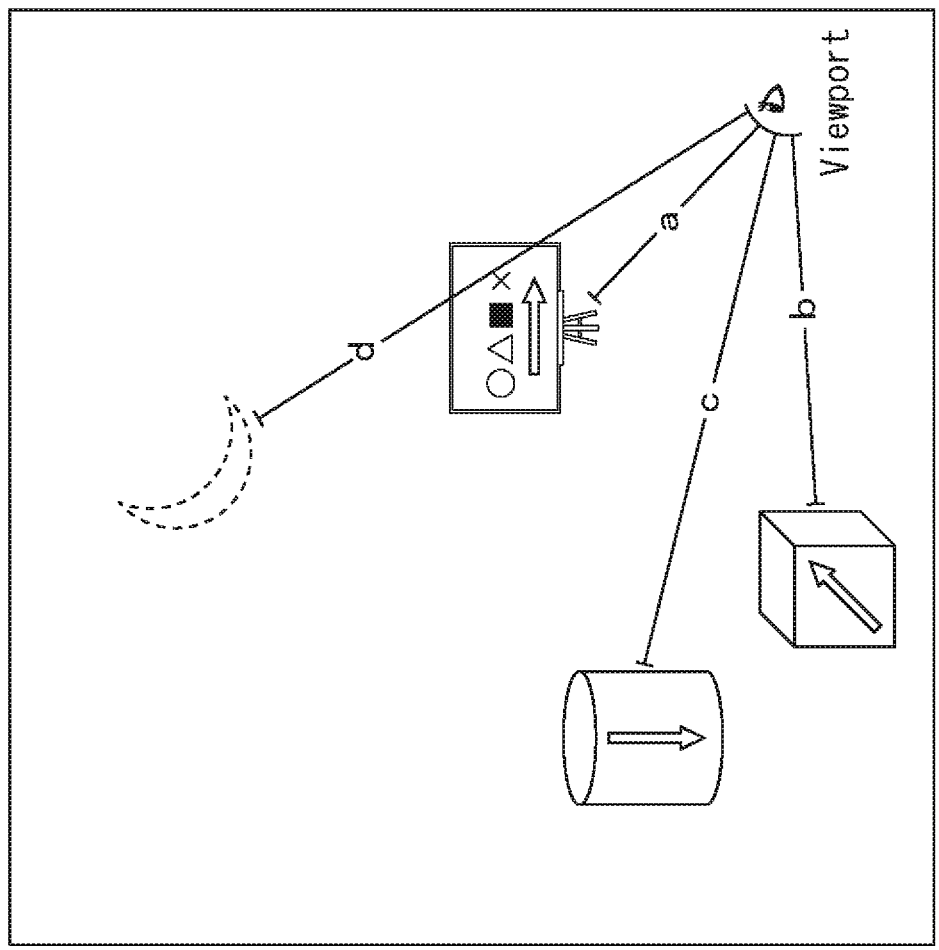
FIG. 3 is a diagram for describing resolution and motion vectors.

Furthermore, the media distribution system 11 can change the resolution of the rendered image according to the distance from the viewport. For example, as illustrated in FIG. 3, the resolution of an object at a position of a distance a, which is closest from the viewport, is the highest, the resolution of an object at a position of a distance b, which is second closest from the viewport, is the second highest, and the resolution of an object at a position of a distance c, which is third closest from the viewport, is the third highest. Then, the resolution of an object at a position of a distance d, which is the background farthest from the viewport, becomes the lowest.

Furthermore, in the media distribution system 11, as indicated by a white arrow in FIG. 3, the motion of the object when viewed from the viewport can be calculated for each object.

Here, in a normal server rendering type 6DoF distribution system, a processing block (6DoF renderer) of 6DoF rendering and a processing block (real-time video encoder) encoding a 2D video after rendering in real time are operated independently. An uncompressed 2D video is output from the processing block of 6DoF rendering, and the real-time video encoder outputs a bitstream obtained by compressing and encoding the 2D video as an input.

Note that the display device 15 may be capable of so-called 3D display (stereo display). In this case, two uncompressed 2D videos for the right eye and the left eye are output from the processing block of the 6DoF rendering, and the encoder compresses and encodes the two videos. The difference between the normal 2D display and the 3D display (stereo display) is only the difference in number of video streams to be handled between one and two. Note that, in the present embodiment, a case of handling one 2D video will be described.

Then, the media distribution system 11 generates and uses metadata based on rendering information indicating what kind of rendering has been performed to generate an image, in addition to the user viewpoint information and the scene description as the content configuration information. Therefore, this enables prioritization such as which of the objects in the image attracts attention and which is an important object to be described. Therefore, the media distribution system 11 can make the real-time guide voice, which has to be reproduced in a limited time, more appropriate content.

Configuration Example of Guide Voice Generation Module

FIG. 4 is a block diagram illustrating a configuration example of the guide voice generation module 27.

As illustrated in FIG. 4, the guide voice generation module 27 includes an encoding parameter generation module 51, a scene description text generation module 52, and a text-to-voice conversion module 53.

The encoding parameter generation module 51 generates a QP map and a motion vector map by using the information supplied from the rendering processing unit 22, and supplies the QP map and the motion vector map to the scene description text generation module 52. In the QP map (point-of-interest map), a point of interest on the rendered image is mapped, and in the motion vector map, a motion vector of an object moving on the rendered image is mapped.

The rendered image, the viewpoint information of the user, and the scene description are supplied from the rendering processing unit 22 to the scene description text generation module 52. Then, the scene description text generation module 52 generates text describing the scene of the rendered image on the basis of the QP map and the motion vector map supplied from the encoding parameter generation module 51, and supplies the text to the text-to-voice conversion module 53.

The text-to-voice conversion module 53 converts the text supplied from the scene description text generation module 52 into sound data with a synthesized voice. Then, the text-to-voice conversion module 53 supplies a guide voice data set including the sound data to the real-time audio encoder 24.

Here, information supplied to the encoding parameter generation module 51 will be described with reference to FIG. 5.

As illustrated in FIG. 5, resolution distribution information, object region information, and image change information are supplied from the rendering processing unit 22 to the encoding parameter generation module 51.

The resolution distribution information is information representing a resolution distribution of the rendered image generated by the rendering process in the rendering processing unit 22.

Figure 2:
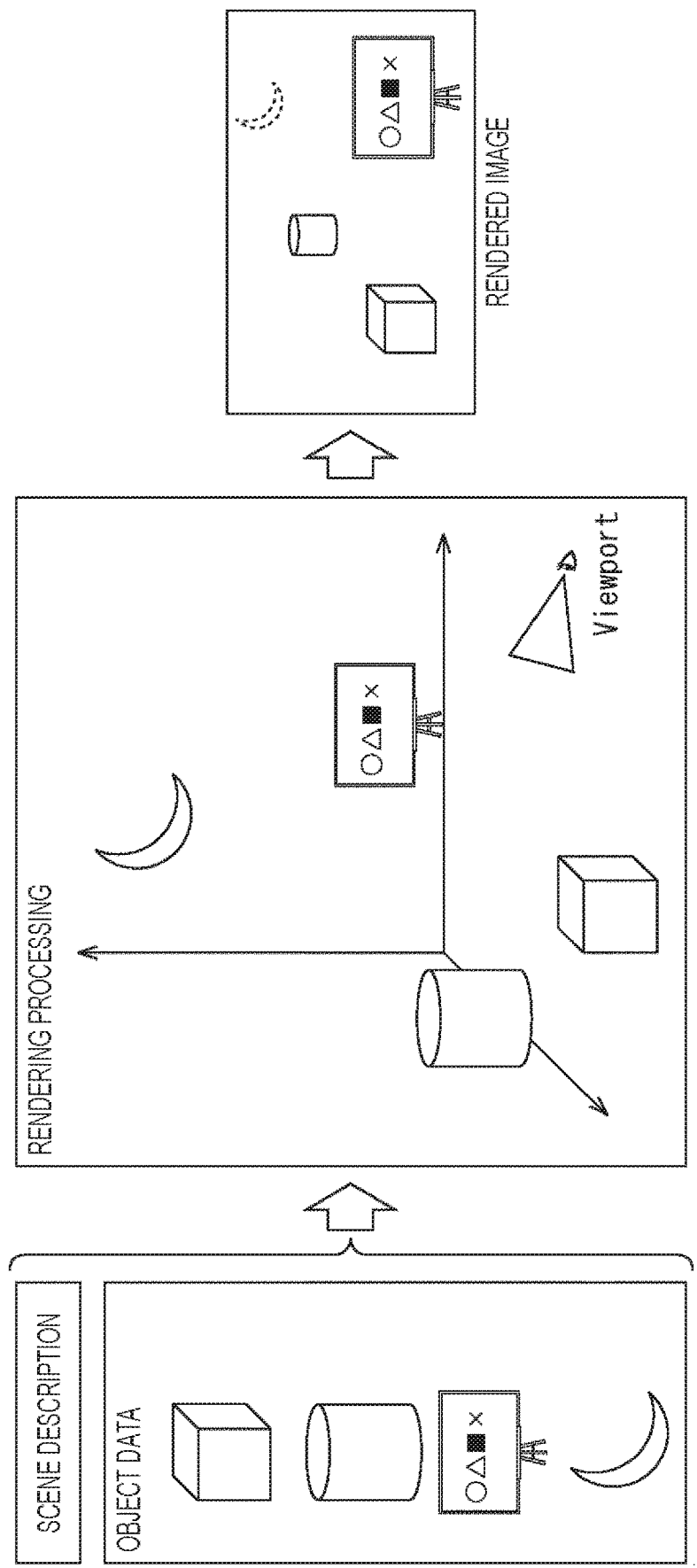
FIG. 2 is a diagram for describing rendering processing.

The rendered image is not necessarily generated with a uniform resolution. As illustrated in FIG. 2, in a case where a plurality of objects is arranged in a virtual 3D space and a video when the virtual 3D space is viewed from a certain viewpoint is rendered, as described with reference to FIG. 3, there is a method of changing the fineness (resolution) when rendering the object, according to the distance between the viewpoint position (virtual camera position) of the user and each of the objects in the three-dimensional virtual space.

By rendering an object at a position close to the viewpoint with high definition (high resolution) and rendering an object at a position distant from the viewpoint with low definition (low resolution), it is possible to reduce a rendering processing load while suppressing subjective image quality degradation. An object that appears small at a large distance may also not be rendered (not depicted).

Moreover, it is also conceivable to change the image quality of rendering by using effective network band information or the like between the edge server 13 and the client 14, and for example, in a case where the transmission speed is low, there is a possibility that the deterioration of the image quality of the encoded video can be suppressed by performing low-definition and low-resolution rendering to reduce the data amount in advance and then performing light compression by the real-time video encoder 23, rather than performing high compression by the real-time video encoder 23 on a high-definition rendered image having a large data amount.

Meanwhile, there is also a method of acquiring the distance information between the viewpoint position and each object from the rendering processing unit 22 instead of the resolution distribution of the rendered image. This information is also generally called depth map. The depth map is a two-dimensional image having only a luminance component such as a grayscale image, and a pixel value and a distance are associated with each other. However, the depth map only represents the distance between the viewpoint and the object, and it is not possible to know at what resolution the rendering processing unit 22 has performed rendering.

Accordingly, in order for the encoding parameter generation module 51 to generate the QP map, acquiring the depth map from the rendering processing unit 22 is not sufficient, and it is necessary to acquire the resolution distribution information. Therefore, the encoding parameter generation module 51 can set a QP value suitable for the resolution of each region by acquiring, from the rendering processing unit 22, the resolution distribution information of the rendered image that is a result reflecting the ingenuity at the time of rendering.

The object region information is information indicating which region in the rendered image each object occupies.

As illustrated in FIG. 5, this information is expressed by a table in which the region in the rendered image occupied by each object, the center position of the object, and the motion vector of the center position of the object are listed. Since the rendering processing unit 22 performs rendering on the basis of the user viewpoint information and the information of the position of each object, the encoding parameter generation module 51 can extract these pieces of information from the rendering processing unit 22.

In general, there is a technology of recognizing an object in a video and separating and extracting a contour of the object using only a 2D video, but there is also erroneous recognition, and it is not easy to obtain accurate information. On the other hand, the rendering processing unit 22 generates a video by rendering, from the viewpoint information and the positional information of each object, and therefore, it is possible to accurately generate information indicating a region occupied by each object in the image.

The center position of the object is the origin of the local coordinates of each object. The motion vector at the center position of the object is described in the scene description, and translation information representing the movement of the origin of the local coordinates is used. The outline of the motion of the object can be known by the center position and the information of the movement of the object.

Note that, as information related to an object obtained from the rendering processing unit 22, occlusion information indicating overlapping or an anteroposterior relationship of objects is conceivable. According to the occlusion information, it is possible to know the anteroposterior relationship between a plurality of objects and a region that is hidden behind other objects and is not visible when viewed from a certain viewpoint position. However, similar to objects that are positioned outside the visual field and are not visible, a region that is hidden behind other objects and is not visible is not included in the rendered video. Thus, it is determined that the information is not useful from the viewpoint of whether the information is necessary for high efficiency of real-time encoding, and the information is not used as input information to the encoding parameter generation module 51.

The image change information is information representing a change in an image, and is a flag indicating whether or not an image generated by rendering is the same as the previous frame.

For example, in a case where there is no viewpoint movement and the object is also stationary, the image to be rendered is the same as the previous frame. In general, in order to detect whether a certain frame is the same as the previous frame, it is sufficient to compare two frames, but the load of the comparison processing is increased. For example, in a case where there is no viewpoint movement and all the objects used for rendering are stationary objects, the rendering processing unit 22 sets this flag to zero. With this flag, the encoding parameter generation module 51 can immediately recognize whether or not two frames are the same without performing frame comparison.

The processing in a case where the frame to be encoded and the previous frame are the same depends on the encoder, but the processing load can be reduced by outputting the same data as the previous frame without encoding the frame, or a data generation amount can be suppressed by outputting only the flag indicating that the frame is the same as the previous frame.

Such resolution distribution information, object region information, and image change information are supplied from the rendering processing unit 22 to the encoding parameter generation module 51. Moreover, as described above, the rendered image is also supplied from the rendering processing unit 22 to the encoding parameter generation module 51.

Then, the encoding parameter generation module 51 generates the QP map and the motion vector map as described above.

With reference to FIG. 6, the QP map and the motion vector map generated by the encoding parameter generation module 51 will be described.

As illustrated in FIG. 6, the QP map includes a list in which the image is divided into rectangular regions that do not overlap each other, and the QP value is determined for each of the rectangular regions.

The rectangular region is determined on the basis of the resolution distribution in the image and the region occupied by each object in the image so as to coincide with a boundary of the region including one or a plurality of macroblocks, coding units (CUs), slices, and the like which are units of compression encoding. By using such information, the real-time video encoder 23 can encode each small region obtained by dividing the screen with a different QP value.

Here, an example of a method of determining the QP value for each rectangular region on the basis of the information input to the encoding parameter generation module 51 will be described. The QP value is a value indicating an interval of re-quantization at the time of lossless compression, and generally has characteristics that, in a case where the value is decreased, a generated code amount is increased but the deterioration of the image quality is small, and in a case where the value is increased, the generation of the code amount is suppressed but the degradation of the image quality is large.

For example, using the information of the resolution distribution in the image, the generated bit amount is relatively increased by decreasing the QP value in the region rendered with high resolution, and the generated bit amount is relatively decreased by increasing the QP value in the region rendered with low resolution, so that the limited generated code amount can be appropriately allocated. Such bit allocation can be performed by analyzing the image itself to be encoded, but an increase in processing load for the analysis is a disadvantage. By using the information of the resolution distribution in the image, the processing can be easily executed without increasing the processing load.

The motion vector map is a table of a list of sets of the non-overlapping rectangular regions and the motion vectors indicating a moving speed and a direction of the region, in the image.

The rectangular region of the motion vector map represents all or a part of the object, and is determined on the basis of the region information occupied by each object in the image while matching the unit of compression encoding in the real-time video encoder 23. On the other hand, the motion vector information refers to the region information occupied by each object in the image of the past or the past and future frames, so as to be capable of detecting how the region occupied by a certain object (which can be specified by the region ID) has moved or will move. Since the region ID is a number uniquely specifying the object (or a part thereof), in principle, the same value is assigned between frames.

The rough motion of each object can be known from the center position of the object and its motion vector, but there is a possibility that a certain part of the object moves in a direction different from the object center, the direction is changed, or deformation occurs. Such motion of the part of the object needs to be searched from edge information or color information of the rendered image. Even in this case, the region information occupied by each object in the image is known so that it is not necessary to search for a movement destination of the object on the entire screen, it is only necessary to search in a region that can be specified by the region ID, and therefore the processing load for the search can be reduced.

Note that the region division in the QP map and the region division in the motion vector map do not necessarily need to match.

Then, the QP map and the motion vector map are supplied from the encoding parameter generation module 51 to the scene description text generation module 52.

The scene description text generation module 52 determines an object or region of interest in the scene, and generates a position of the point of interest in the scene and detailed description text. The QP map can be used to determine an object or region of interest in the scene. By referring to the QP map, it is possible to find a region to be encoded while suppressing the deterioration of the image quality in the image. That is, a region having a small QP value is an important portion in the image, and can be regarded as a portion where the user can easily pay attention or a portion where attention is desired to be paid by the user.

The reason for using the QP map that is the output from the encoding parameter generation module 51 instead of directly using the resolution distribution of the rendered image that is the input information to the encoding parameter generation module 51 is as follows. The resolution distribution of the rendered image does not necessarily represent the resolution in units of objects, and can represent the resolution distribution in units of pixels as a minimum unit by subdividing one object. On the other hand, since the QP map is a kind of metadata obtained by extracting and abstracting features of the resolution distribution, the importance level of the region can be more easily known by a single numerical value such as a QP value. Then, since the real-time video encoder 23 performs encoding on the basis of the QP map, the QP map has a characteristic of more accurately representing the image quality of the video finally presented to the user.

An example of how the scene description text generation module 52 uses the QP map to generate the text describing a scene is illustrated.

For example, a method is considered in which, in a case of selecting an object as a target to be described, the scene description text generation module 52 refers to the QP map and selects an object included in a region in order from a region having a smaller QP value. In a case where the number of objects to be described is large, the number of target objects can be limited by performing prioritization such as generating guide voice data only for the objects included in the region having a QP value smaller than a certain QP value. On the other hand, the target object is not necessarily selected only by the QP value. Although the QP value is not minimum, implementation measures such as giving priority to an object present in a central region of the screen and giving priority to an object in a region having a high screen occupancy are also considered.

Moreover, the scene description text generation module 52 can generate the description text also considering the motion of the object by combining with the motion vector map. For example, the scene description text generation module 52 can generate the description text of an object moving to the screen center, and also generate the description text that informs the user what the object going out of the screen is.

Although the scene description illustrates the motion of the object in the three-dimensional virtual space, the scene description text generation module 52 cannot generate text describing the motion of the object only with the scene description. This is because the motion of the object in the rendered video is determined by the relative relationship with the viewpoint position (and the viewpoint direction and viewing angle) of the user.

Therefore, by using the motion vector map output from the encoding parameter generation module 51, the scene description text generation module 52 can more directly acquire information of the direction in which the object moves when viewed from the viewpoint position of the user, and can reflect the information on the description text. The scene description includes the name, attribute, and detailed information of the object. In a case where the name and detailed information of the object are included in the description text, the scene description text generation module 52 may extract necessary information from the scene description.

For example, as one form of the scene description, there is a scene description described in GL Transmission Format (glTF). glTF is a format for scene description developed by the Khronos Group, and expresses a 3D model and a scene in a JavaScript Object Notation (JSON) format. By glTF, position coordinates such as where and in which direction an object is arranged in the virtual space, and animation such as movement and deformation of the object can be expressed. In addition, it is highly extensible, and it is also possible to store text information describing the name and content of the object in the extension region.

From the detailed information of each object stored in the scene description, the scene description text generation module 52 generates a sentence suitable for the guide voice and reads out the sentence with the synthesized voice, thereby generating sound data describing each object.

Note that, as the user viewpoint information used when the scene description text generation module 52 generates the description text, the user viewpoint information used for the rendering processing by the rendering processing unit 22 is used instead of the user viewpoint information as supplied from the client 14 to the edge server 13. The rendering processing unit 22 can use the user viewpoint information by modifying the user viewpoint information by a prediction technique such as line-of-sight prediction instead of using the user viewpoint information from the client 14 as it is. For example, it is possible to devise rendering with slightly future user viewpoint information in consideration of a transmission delay. By the rendering processing unit 22 providing such modified user viewpoint information to the guide voice generation module 27, the scene description text generation module 52 can generate the description text to accurately correspond to the rendered image. As described above, the user viewpoint information supplied from the application 26 to the rendering processing unit 22 does not necessarily need to match the user viewpoint information supplied from the rendering processing unit 22 to the guide voice generation module 27.

As described above, in the guide voice generation module 27, the QP map is regarded as the point-of-interest map, the object as a target to be described is selected in combination with the motion vector map, and the text describing the object is generated using the attribute information and the detailed description of the object included in the scene description. Then, the generated text is converted into sound data by the text-to-voice conversion module 53. Information of the reproduction start time and the utterance position is added to the sound data, and the sound data is output as guide voice data.

FIG. 7 illustrates the contents of the guide voice data.

An element of the guide voice data is expressed by a set of reproduction start time t1, coordinates (x1, y1, z1) in a three-dimensional virtual space when the sound data is emitted from a point sound source, and sound data data1.wav expressed in a Pulse Code Modulation (PCM) format and the like. A large number of these sets will be generated depending on the situation of the scene.

The guide voice data is supplied to the real-time audio encoder 24.

The real-time audio encoder 24 mixes the output audio from the rendering processing unit 22 with the guide voice. The mixing ratio can be determined based on the coordinate information of the utterance position included in the guide voice data. Then, the mixed audio is encoded, and transmitted from the real-time audio encoder 24 to the client 14 via the transmission and reception unit 25.

Through the above processing, the QP map and the motion vector map are output from the encoding parameter generation module 51, and the scene description text generation module 52 can select an object to be described and perform prioritization on the basis of the information.

Then, the content of the description text is generated from the position, size, motion, and movement direction of the object in the rendered image, the attribute, the detailed description, and the like of the object described in the scene description.

The description text is converted into sound data by the synthesized voice in the text-to-voice conversion module 53, and is reproduced at the set time and position. Therefore, real-time guide voice generation for explaining 6DoF content by a voice can be realized.

Note that, in the present embodiment, in order to simplify the description, the description has been made in which one QP value and one motion vector are assigned to one object, but there is also a case where only a part of a certain object moves. At that time, in the rendered image output from the rendering processing unit 22, a region occupied by one object may be further divided into a plurality of small regions, and a QP value and a motion vector may be assigned to each of the small regions.

For example, it is assumed that the electronic bulletin board at the lower right in the rendered image output from the rendering processing unit 22 illustrated in FIG. 4 does not move, but the characters to be presented are scrolled and flow in the lateral direction. In this case, the motion vector can be set more accurately by setting the outer frame and the character display portion of the electronic bulletin board as different regions and setting the motion vector only in the region of the character display portion.

<Guide Voice Generation Processing>

Figure 8:
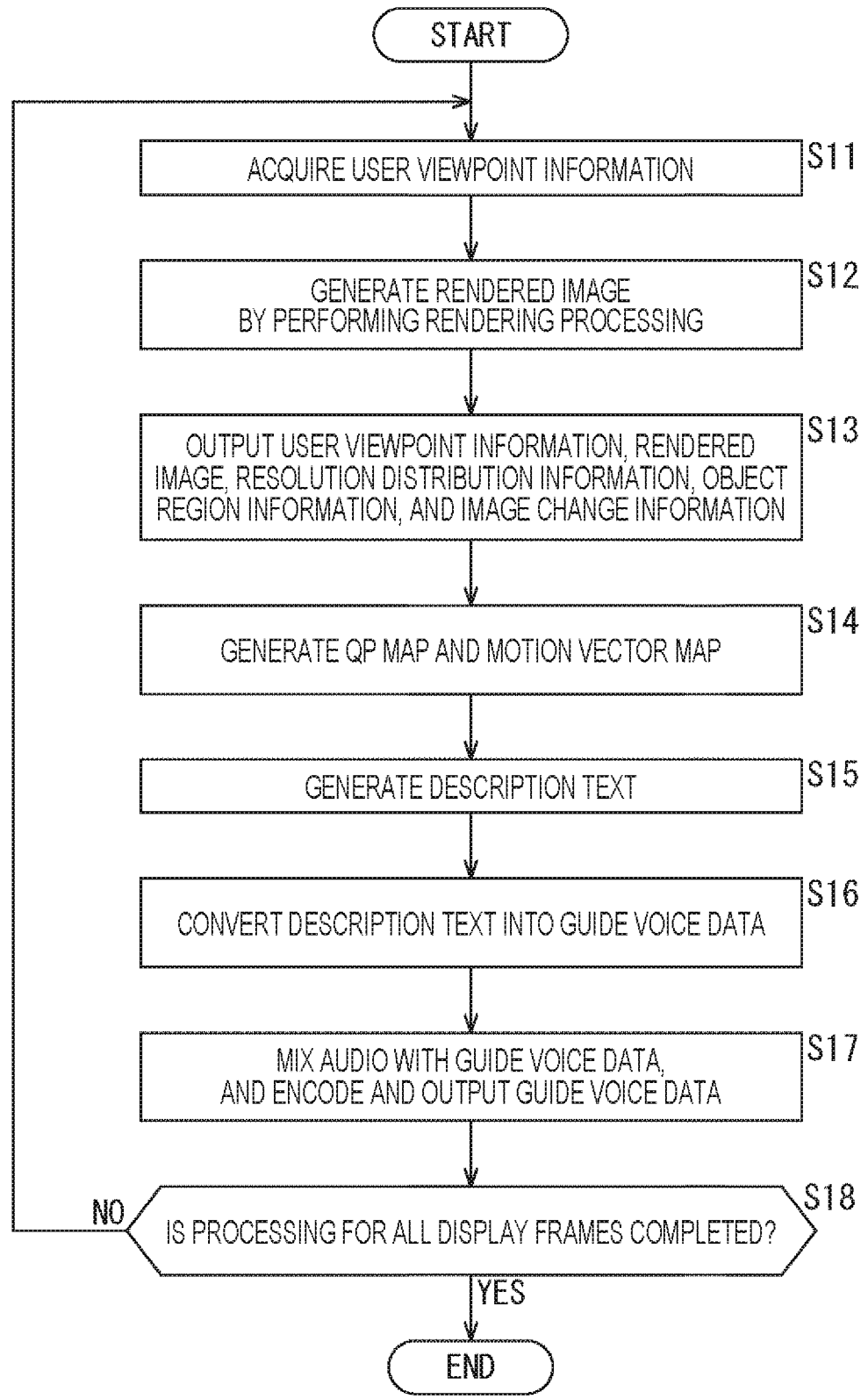
FIG. 8 is a flowchart illustrating guide voice generation processing.

FIG. 8 is a flowchart illustrating guide voice generation processing executed in the edge server 13.

For example, the guide voice generation processing is performed for each display frame, and in step S11, the application 26 acquires the user viewpoint information, and supplies the user viewpoint information to the rendering processing unit 22.

In step S12, the rendering processing unit 22 performs the rendering processing according to the user viewpoint information supplied in step S11 to generate a rendered image.

That is, the rendering processing unit 22 generates a video when the virtual space in which the objects are arranged on the basis of the scene description is viewed from the position and direction of the viewpoint of the user by the rendering processing, and outputs the rendered image to the real-time video encoder 23.

In step S13, the rendering processing unit 22 outputs the user viewpoint information, the rendered image, the resolution distribution information, the object region information, and the image change information to the encoding parameter generation module 51.

In step S14, the encoding parameter generation module 51 generates the QP map and the motion vector map on the basis of the rendered image and various kinds of information supplied from the rendering processing unit 22 in step S13, and supplies the QP map and the motion vector map to the scene description text generation module 52.

In step S15, the scene description text generation module 52 generates the description text by using the QP map and the motion vector map in addition to the user viewpoint information, the rendered image, and the scene description, and outputs the description text to the text-to-voice conversion module 53. At this time, the scene description text generation module 52 determines objects to be described by a voice and their priorities among the objects in the rendered image, and generates the description text.

In step S16, the text-to-voice conversion module 53 converts the description text supplied from the scene description text generation module 52 in step S15 into guide voice data, and supplies the guide voice data to the real-time audio encoder 24.

In step S17, the real-time audio encoder 24 mixes the guide voice data with the original output audio output from the rendering processing unit 22 according to the specified time and spatial position, encodes and outputs the guide voice data.

In step S18, it is determined whether or not the processing for all the display frames is completed, and in a case where it is determined that the processing for all the display frames is not completed, the processing returns to step S11, and similar processing is repeatedly performed thereafter.

On the other hand, in a case where it is determined in step S18 that the processing for all the display frames is completed, the guide voice generation processing is ended.

As described above, the text describing the content of the video viewed by the user can be generated from the user viewpoint information and the scene description which is the content configuration information, by the guide voice generation processing. At this time, not all guide voices reproduced in real time can be necessarily reproduced. That is, it is necessary to select the description content. Therefore, by using encoding parameter information for real-time encoding in addition to the viewpoint information and the scene description, it is possible to prioritize which of the objects in the image attracts attention and which object should be described as an important object.

That is, the guide voice generation module 27 acquires, from the rendering processing unit 22, information such as the resolution distribution in the video generated by rendering, which region in the video has been simplified in rendering, and the object that has not been rendered (has not been displayed). Therefore, the guide voice generation module 27 recognizes a region depicted with high definition, a region depicted with low definition, a blurred region, and the like of the video to be presented to the user. Accordingly, using these pieces of information, the scene description text generation module 52 can generate, in real time, text data that appropriately describes the information obtained when viewing the video. Then, the user can listen to the content of the text data by the text data being pronounced with the synthesized voice.

Accordingly, the media distribution system 11 can select and prioritize objects to be described, so that the real-time guide voice that needs to be reproduced in a limited time can have more appropriate contents.

In this manner, the media distribution system 11 uses the encoding parameter information based on the information at the time of rendering as a criterion for determining which object should be described with the guide voice, and thereby the guide voice can be generated which appropriately describes an image content of the 6DoF content in which the scene to be displayed cannot be determined in advance. In reality, it is difficult for a person to determine which object in the image should be described by a voice, but in the media distribution system 11, parameter information for performing encoding with high efficiency can be used as a method of mechanically selecting and prioritizing objects.

Configuration Example of Computer

Next, the above-described series of processing (media distribution method) can be performed by hardware or can be performed by software. In a case where the series of processing is performed by software, a program constituting the software is installed in a general-purpose computer and the like.

FIG. 9 is a block diagram illustrating a configuration example of an embodiment of a computer in which a program for executing the above-described series of processing is installed.

The program can be recorded in advance in a hard disk 105 or a ROM 103 as a recording medium built in the computer.

Furthermore, the program can be stored (recorded) in a removable recording medium 111 driven by a drive 109. Such a removable recording medium 111 can be provided as so-called package software. Here, as the removable recording medium 111, for example, there are a flexible disk, a compact disc read only memory (CD-ROM), a magneto optical (MO) disk, a digital versatile disc (DVD), a magnetic disk, a semiconductor memory, and the like.

Note that the program can be installed in the computer from the removable recording medium 111 as described above, or can be installed in the built-in hard disk 105 by being downloaded to the computer via a communication network or a broadcast network. That is, for example, the program can be wirelessly transferred from a download site to the computer via an artificial satellite for digital satellite broadcasting, or can be transferred by wire to the computer via a network such as a local area network (LAN) or the Internet.

The computer incorporates a central processing unit (CPU) 102, and an input and output interface 110 is connected to the CPU 102 via a bus 101.

Accordingly, in a case where a command is input by a user operating an input unit 107 and the like via the input and output interface 110, the CPU 102 executes a program stored in the read only memory (ROM) 103 according to the command. Alternatively, the CPU 102 loads the program stored in the hard disk 105 into a random access memory (RAM) 104 and executes the program.

Therefore, the CPU 102 performs the processing according to the above-described flowchart or the processing performed by the configuration of the above-described block diagram. Then, the CPU 102 outputs the processing result from an output unit 106, transmits the processing result from a communication unit 108, or records the processing result in the hard disk 105 via the input and output interface 110, for example, as necessary.

Note that the input unit 107 includes a keyboard, a mouse, a microphone, and the like. Furthermore, the output unit 106 includes a liquid crystal display (LCD), a speaker, and the like.

Here, in the present specification, the processing performed by the computer according to the program is not necessarily performed in time series in the order described as the flowchart. That is, the processing performed by the computer according to the program also includes processing executed in parallel or individually (for example, parallel processing or processing depending on objects).

Furthermore, the program may be processed by one computer (processor) or may be processed in a distributed manner by a plurality of computers. Moreover, the program may be transferred to a remote computer and executed.

Moreover, in the present specification, a system means a set of a plurality of configuration elements (devices, modules (components), and the like) and it does not matter whether or not all the configuration elements are in the same housing. Therefore, a plurality of devices that is housed in separate housings and connected via a network, and one device in which a plurality of modules is housed in one housing are both systems.

Furthermore, for example, a configuration described as one device (or processing unit) may be divided and configured as a plurality of devices (or processing units). Conversely, the configurations described above as a plurality of devices (or processing units) may be collectively configured as one device (or processing unit). Furthermore, a configuration other than the above-described configuration may be added to the configuration of each device (or each processing unit). Moreover, as long as the configuration and operation of the entire system are substantially the same, a part of the configuration of a certain device (or processing unit) may be included in the configuration of another device (or another processing unit).

Furthermore, for example, the present technology can have a configuration of cloud computing in which one function is shared and processed in cooperation by a plurality of devices via a network.

Furthermore, for example, the above-described program can be executed in an arbitrary device. In that case, the device is only required to have a necessary function (functional block and the like) and obtain necessary information.

Furthermore, for example, each step described in the above-described flowcharts can be executed by one device or can be shared and executed by a plurality of devices. Moreover, in a case where a plurality of kinds of processing is included in one step, the plurality of kinds of processing included in the one step can be executed by one device or can be shared and executed by a plurality of devices. In other words, a plurality of kinds of processing included in one step can also be executed as processing of a plurality of steps. Conversely, the processing described as a plurality of steps can be collectively executed as one step.

Note that, in the program executed by the computer, processing of steps describing the program may be executed in time series in the order described in the present specification, or may be executed in parallel or individually at necessary timing such as when a call is made. That is, as long as there is no contradiction, the processing of each step may be executed in an order different from the above-described order. Moreover, the processing of steps describing the program may be executed in parallel with the processing of another program, or may be executed in combination with the processing of another program.

Note that a plurality of the present technologies described in the present specification can be implemented independently as a single body as long as there is no contradiction. Of course, a plurality of arbitrary present technologies can be implemented in combination. For example, some or all of the present technology described in any of the embodiments can be implemented in combination with some or all of the present technology described in other embodiments. Furthermore, some or all of the above-described arbitrary present technology can be implemented in combination with other technologies not described above.

Combination Example of Configuration

Note that the present technology can also have the following configurations.

(1) A media distribution device including:
a guide voice generation unit that generates a guide voice describing a rendered image viewed from a viewpoint in a virtual space by using a scene description as information describing a scene in the virtual space and a user viewpoint information indicating a position and a direction of the viewpoint of a user; and
an audio encoding unit that mixes the guide voice with original audio, and encodes the guide voice.

(2)
The media distribution device described in (1),
in which the guide voice generation unit includes
an encoding parameter generation unit that generates an encoding parameter by using information supplied from a rendering processing unit that generates the rendered image,
a scene description text generation unit that generates a description text describing a scene according to the rendered image by using the encoding parameter, and
a voice conversion unit that converts the description text into a voice.

(3)
The media distribution device described in (2),
in which the encoding parameter generation unit generates a QP map representing a distribution of interest degrees according to a resolution of the rendered image, as the encoding parameter.

(4)
The media distribution device described in (2) or (3),
in which the encoding parameter generation unit generates a motion vector map representing a distribution of motions of an object in the rendered image, as the encoding parameter.

(5)
A media distribution method including:
by a media distribution device,
generating a guide voice describing a rendered image viewed from a viewpoint in a virtual space by using a scene description as information describing a scene in the virtual space and a user viewpoint information indicating a position and a direction of the viewpoint of a user, and
mixing the guide voice with original audio, and encoding the guide voice.

(6)
A program causing a computer of a media distribution device to execute processing including generating a guide voice describing a rendered image viewed from a viewpoint in a virtual space by using a scene description as information describing a scene in the virtual space and a user viewpoint information indicating a position and a direction of the viewpoint of a user, and mixing the guide voice with original audio, and encoding the guide voice.

Note that the embodiments are not limited to the above-described embodiments, and various modifications can be made without departing from the gist of the present disclosure. Furthermore, the effects described in the present specification are merely examples and are not limited, and may have other effects.

REFERENCE SIGNS LIST

11 Media distribution system
12 Content server
13 Edge server
14 Client
15 Display device
16 Network
21 Scene construction unit
22 Rendering processing unit
23 Real-time video encoder
24 Real-time audio encoder
25 Transmission and reception unit
26 Application
31 Transmission and reception unit
32 Decoder
33 Cropping processing unit
34 Application
41 Display unit
42 Voice output unit
43 Detection unit
51 Encoding parameter generation module
52 Scene description text generation module
53 Text-to-voice conversion module

The invention claimed is:

1. A media distribution device, comprising:
a rendering processing unit configured to generate a rendered image;
a guide voice generation unit configured to generate a guide voice that describes the rendered image viewed from a viewpoint in a virtual space, wherein
the guide voice is generated based on a scene description and a user viewpoint information,
the scene description describes a scene in the virtual space,
the user viewpoint information indicates a position and a direction of the viewpoint of a user, and
the guide voice generation unit includes:
an encoding parameter generation unit configured to generate an encoding parameter based on information supplied from the rendering processing unit;
a scene description text generation unit configured to generate a description text based on the rendered image and the encoding parameter, wherein the description text includes the scene description that describes the scene in the virtual space; and
a voice conversion unit configured to convert the description text into a voice; and an audio encoding unit configured to:
mix the guide voice with original audio; and
encode the mixed guide voice.

2. The media distribution device according to claim 1, wherein
the encoding parameter generation unit is further configured to generate a QP map as the encoding parameter, and
the QP map represents a distribution of interest degrees based on a resolution of the rendered image.

3. The media distribution device according to claim 1, wherein
the encoding parameter generation unit is further configured to generate a motion vector map as the encoding parameter, and
the motion vector map represents a distribution of motions of an object in the rendered image.

4. A media distribution method, comprising:
in a media distribution device;
generating a rendered image;
generating an encoding parameter based on the rendered image;
generating a description text based on the rendered image and the encoding parameter, wherein the description text includes scene description that describes a scene in a virtual space;
converting the description text into a voice;
generating a guide voice based on the voice, wherein the guide voice describes the rendered image viewed from a viewpoint in the virtual space, wherein
the guide voice is generated based on the scene description and a user viewpoint information,
the scene description describes the scene in the virtual space, and
the user viewpoint information indicates a position and a direction of the viewpoint of a user;
mixing the guide voice with original audio; and
encoding the mixed guide voice.

5. A non-transitory computer-readable medium having stored thereon computer-executable instructions that, when executed by a computer, cause the computer to execute operations, the operations comprising:
generating a rendered image;
generating an encoding parameter based on the rendered image;
generating a description text based on the rendered image and the encoding parameter, wherein the description text includes scene description that describes a scene in a virtual space;
converting the description text into a voice;
generating a guide voice based on the voice, wherein the guide voice describes the rendered image viewed from a viewpoint in the virtual space, wherein
the quide voice is generated based on the by using a scene description and a user viewpoint information,
the scene description describes the as information describing a scene in the virtual space, and
the user viewpoint information indicating indicates a position and a direction of the viewpoint of a user;
mixing the guide voice with original audio; and
encoding the mixed guide voice.

* * * * *